United States Patent [19]
Greytak et al.

[11] 3,854,396
[45] Dec. 17, 1974

[54] TWINE MEASURING TRIP MECHANISM FOR BALERS

[76] Inventors: Donald A. Greytak, P.O. Box 1267; Duane S. Sargent, 1146 Wilson Ave., both of Harve, Mont. 59501

[22] Filed: July 12, 1973

[21] Appl. No.: 378,388

[52] U.S. Cl. .................................................. 100/4
[51] Int. Cl. ............................................. B65b 57/10
[58] Field of Search ................ 100/1, 4, 10; 33/141

[56] References Cited
UNITED STATES PATENTS

| | | | |
|---|---|---|---|
| 2,911,904 | 11/1959 | Weiss | 100/4 |
| 3,274,921 | 9/1966 | Hall | 100/4 |
| 3,515,055 | 6/1970 | Timmerbeil | 100/4 |

*Primary Examiner*—Harvey C. Hornsby
*Assistant Examiner*—Robert Pous
*Attorney, Agent, or Firm*—Clarence A. O'Brien & Harvey B. Jacobson

[57] ABSTRACT

A twine measuring mechanism for actuating the tying or knotting mechanism of a hay baler wherein the twine is pressed against a measuring wheel. The measuring wheel rotates in response to movement of the twine and actuates a gear train which selectively trips a switch and actuates the knotting mechanism. The length of the bales can be varied through the utilization of easily mounted interchanging measuring wheels.

7 Claims, 8 Drawing Figures

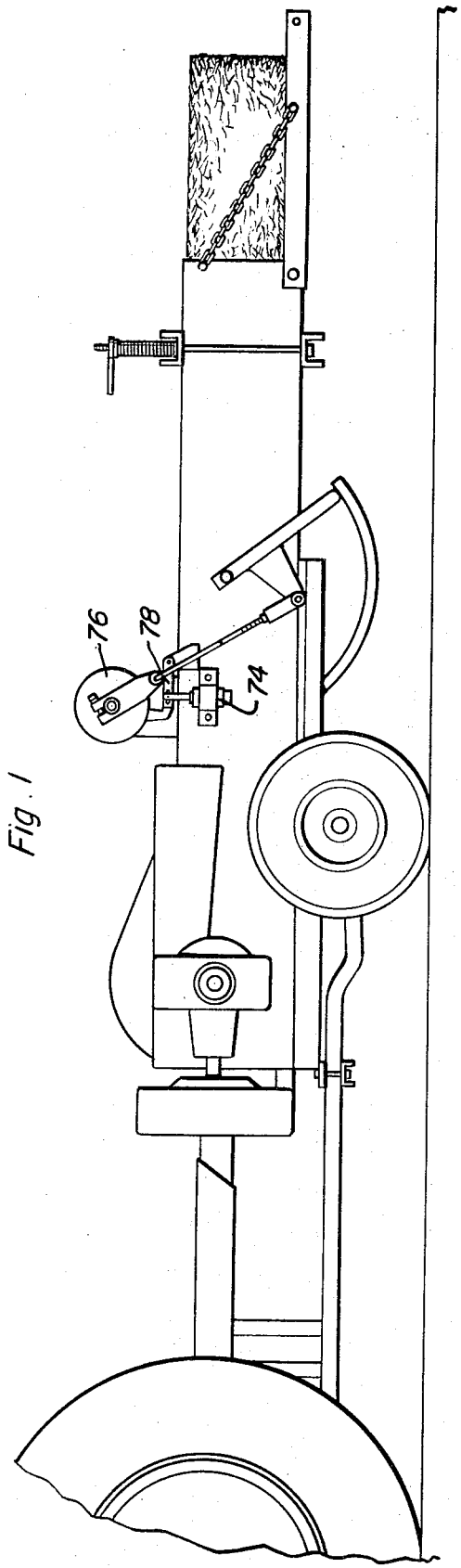
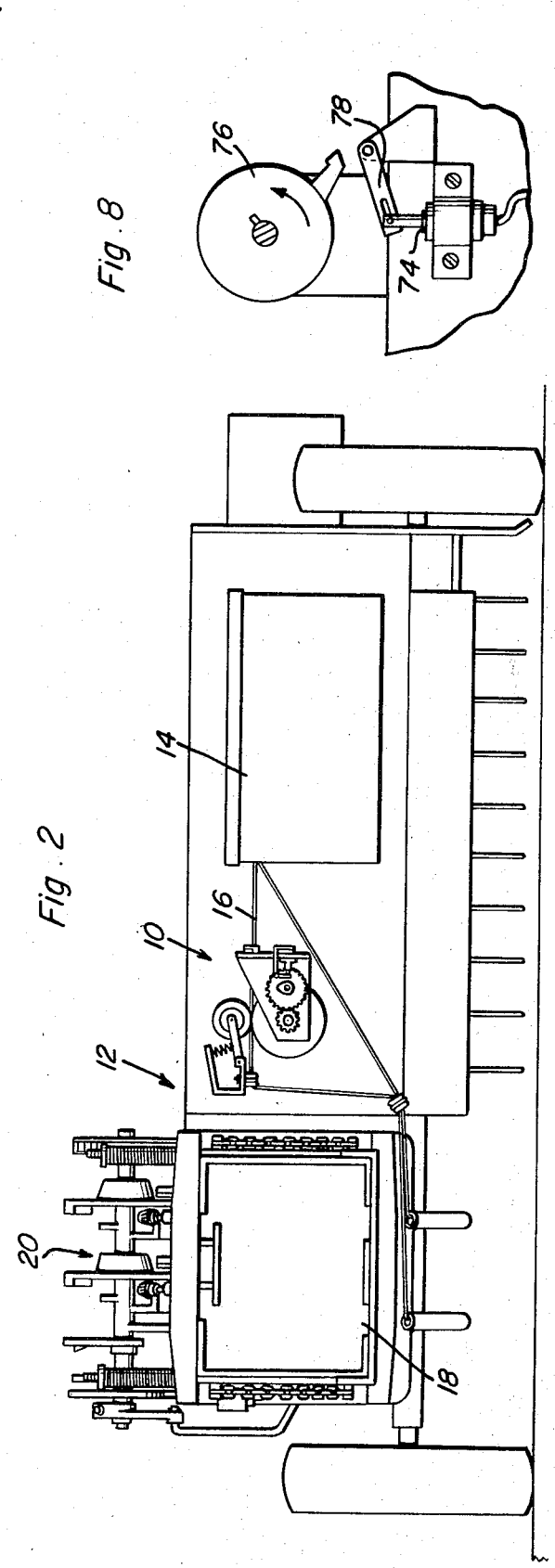

TWINE MEASURING TRIP MECHANISM FOR BALERS

The present invention generally relates to hay or straw balers and the like, and is more particularly concerned with means for forming accurately sized bales through a direct measuring of the amount of twine, wire, or the like supplied as the bale is being formed.

It is a primary intention of the invention to provide a mechanism which will trip or actuate the knotter mechanism of a conventional hay baler in a manner so as to provide uniform bales of constant density and size.

While various means, both automatic and manual, are known for regulating bale size, most such means are relatively inaccurate, mechanically complex, and difficult to adapt to a conventional baler. The mechanism of the present invention, on the other hand, has been found to be, while of a basically simple construction, highly reliable and exact in its operation. Basically, the mechanism operates in response to the passage of a predetermined amount of twine or wire from the supply box to the knotting mechanism. The measuring mechanism consists of one of a plurality of interchangeable measuring wheels, depending upon the size of the bale desired, over which the twine rides. The twine is held against the measuring roller by a spring-loaded pressure roller whereby passage of the twine effects a rotation of the measuring roller which rotation actuates a gear train. The gear train mounts a rotating cam which in turn selectively actuates the knotter mechanism through either a switch controlled solenoid arrangement or through a mechanical linkage.

Utilizing a mechanism of this type, it has been found that a high degree of control of the bale size can be maintained with the mechanism itself being readily adapted to any conventional baler by merely interposing the mechanism within the path of the twine between the twine supply and the knotting mechanism.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a side elevational view of a baler incorporating the invention;

FIG. 2 is an end elevational view of the baler with the mounted mechanism;

FIG. 8 details the solenoid controlled trip for the tying or knotter mechanism.

Figure 3:
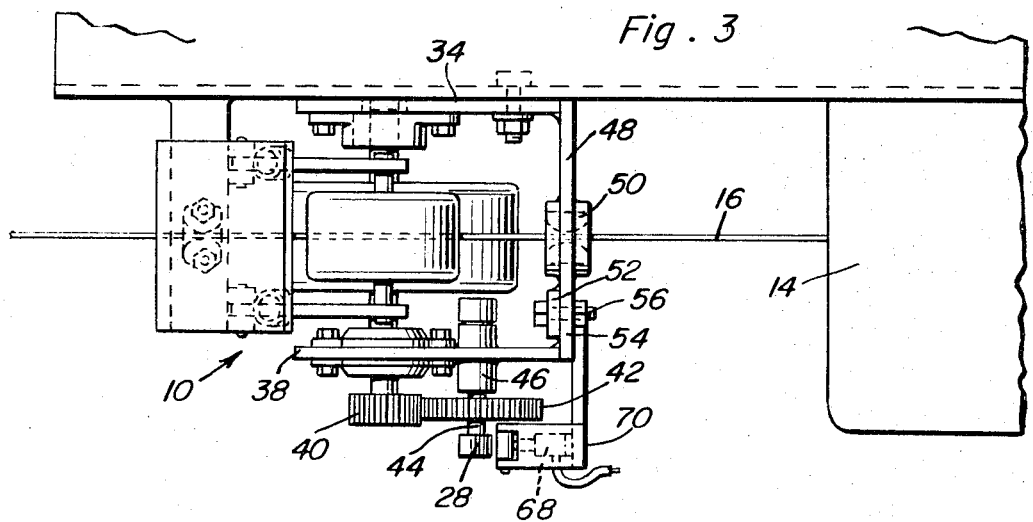
FIG. 3 is an enlarged top plan view of the twine measuring mechanism.
Figure 4:
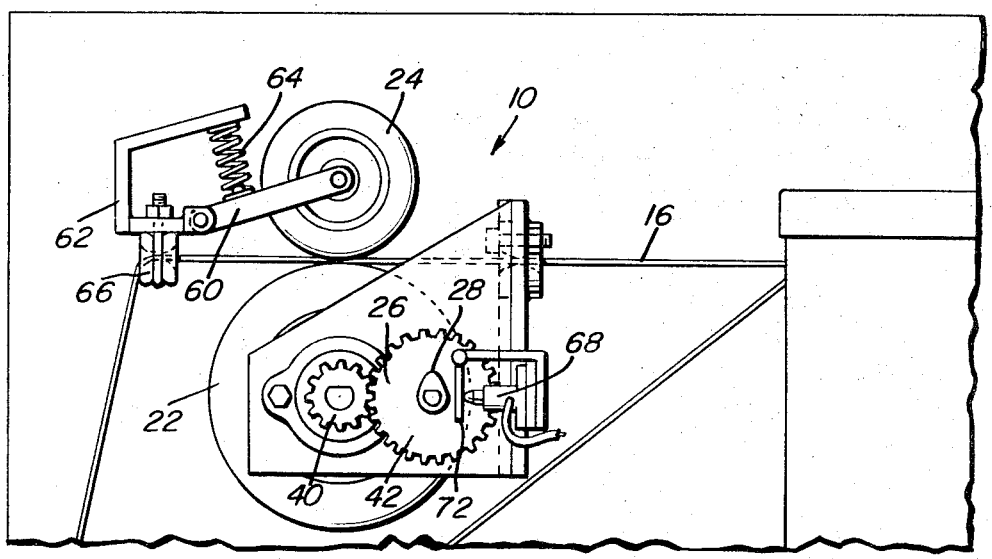
FIG. 4 is an elevational view of the twine measuring mechanism.
Figure 5:
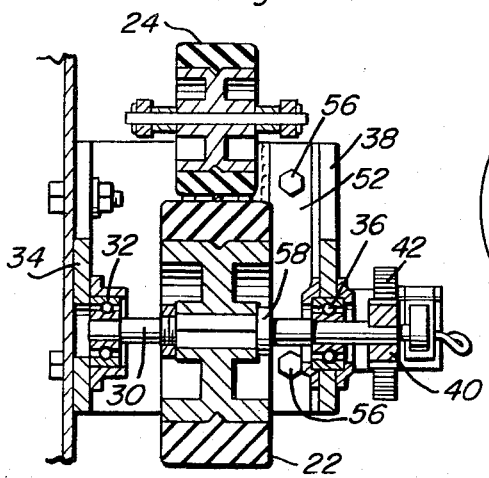
FIG. 5 is a cross-sectional detail taken through the measuring wheel and pressure wheel.

Referring now more specifically to the drawings, reference numeral 10 is used to designate the twine measuring trip mechanism of the invention. This mechanism 10 is to be mounted on a conventional baler 12 outward of the twine supply or twine box 14 along the path of movement taken by the twine 16 to the bale chamber 18 and knotter or typing apparatus 20.

The mechanism 10 consists basically of a large rubber faced measuring wheel or roller 22, an overlying smaller rubber faced pressure wheel or roller 24, a gear train 26 and a tripping cam 28. The pressure roller 22 is releasably keyed to a roller shaft 30 having an inner end rotatably received within a first bearing 32 affixed to a baler mounted plate 34, and a second intermediate portion, to the opposite side of the wheel 22, mounted within a second bearing 36 affixed to an outer plate 38. The second end of the wheel shaft 30 projects outward beyond the bearing 36 and mounts a small reduction gear 40 which in turn meshes with a larger gear 42, these gears constituting the gear train 26. The larger gear 42 is mounted on a shaft 44 rotatably supported within an appropriate bearing unit 46 mounted on the outer plate 38. The shaft 44 projects outwardly beyond the gear 42 and mounts the actuating cam 28.

Figures 6, 7:
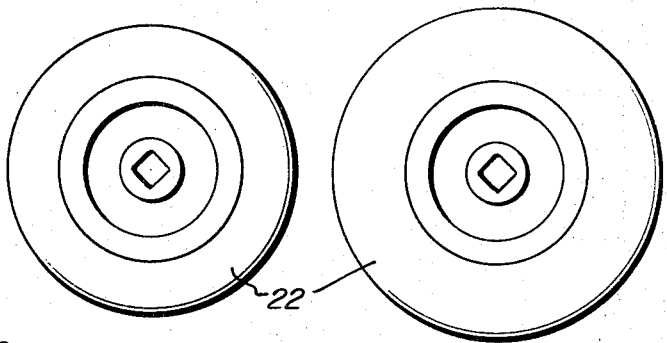
FIGS. 6 and 7 illustrate various size interchangeable measuring wheels or rollers.

Rigid with the mounting plate 34 is a right angularly directed plate 48 which projects outwardly between the measuring roller 22 and the twine supply 14. This plate 48 mounts a twine guiding spool 50 orientated so as to guide the twine 16 therethrough and into engagement with the outer periphery of the measuring roller 22. The outer portion of the plate 48 has an offset flange 52 rigidly affixed thereto. The outer gear and roller mounting plate 38 includes a right angularly directed flange 54 on the inner edge thereof. This flange 54 engages against both the face of the flange 52 and the outer edge of the main plate 48 and is releasably bolted in place by appropriate upper and lower nut and bolt units 56. By making the outer plate 38, through the flange 54, removable, a simplified means is provided for effecting a removal of the measuring wheel or roller 22 whereby measuring rollers of different sizes, as suggested in FIGS. 6 and 7, can be interchangeably used. This in turn provides for a simple and uncomplicated manner of changing the bale sizes. In removing the plate 38, so as to obtain access to the measuring roller 22, it will be appreciated that the gear train 26 will also be temporarily removed as well as any retaining collar 58 or the like used to position the measuring roller 22.

The pressure wheel or roller 24 is rotatably mounted on the outer end of a yoke 60 having the inner end pivoted to a mounting bracket 62 which includes an expanded coil biasing spring 64 engaged between an overlying portion of the bracket 62 and the yoke 60 so as to bias the yoke 60 and the pressure wheel 24 into twine clamping engagement with the measuring wheel 22. The bracket 62 also mounts a second twine guiding spool 66 receiving the twine from between the wheels 22 and 24 for continued movement along its conventional path to the actual tying apparatus.

The rotating cam 28 is to periodically trigger or actuate the knotting mechanism. While this can be effected through a mechanical linkage exending from a point of engagement by the cam 28 and the knotting apparatus 20, the preferred manner of effecting the control is through a switch actuated solenoid as illustrated. The switch 68 is mounted on the plate 38 by an appropriate bracket 70 and includes a pressure receiving plate 72 in the path of the rotating cam 28. When the switch 68 is pressed by the cam 28, an electric current actuates a solenoid unit 74 adjacent the knotter stack trip clutch 76 so as to effect a retraction of a pivotally mounted clutch stop 78 resulting in a corresponding activation of the knotting apparatus for operation in the conventional manner.

In operation, the twine or wire 16 travels from the supply box 14 through the first spool 50 and between the measuring wheel 22 and the pressure wheel 24. The twine is forcibly held against the twine measuring wheel 22 by the spring-loaded pressure wheel, causing a rotation of the wheels as the twine is pulled by the charge of hay in the bale chamber and during the tying operation. The turning of the measuring wheel 22 turns the wheel shaft 30, driving the small reduction gear 40. This gear 40 meshes with and drives the larger gear 42, effecting a rotation of the actuating or tripping cam 28. As the cam comes in contact with the pressure plate or cam follower 72, the switch 68 is actuated and an electric current pulses the solenoid unit 74 so as to retract the clutch stop 78 and activate the tying or knotting apparatus.

Operating in this manner, consistently sized bales are formed with any desired change in the bale size being easily effected by the replacement of the measuring wheel 22 itself. No elaborate mechanical adjustments or the like are required with the basic simplicity of the construction ensuring continued trouble free operation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. For use in a baler incorporating knotting apparatus and a twine supply, a twine measuring mechanism for actuation of the knotting apparatus in response to movement of a predetermined amount of twine, said, mechanism being positioned between the twine supply and the knotting apparatus for reception of the twine as it moves from the supply to the knotting apparatus, said mechanism comprising a twine measuring element engageable by the twine and movable in response to passage of the twine thereover, and control means operative in response to a predetermined movement of the twine measuring element to activate the knotting apparatus, said twine measuring element comprising a rotatably mounted measuring wheel engageable at a point on its periphery by the twine with the frictional engagement therebetween effecting a rotation of the wheel in response to movement of the twine.

2. The mechanism of claim 1 including a free rotating pressure wheel biased against the measuring wheel with the twine sandwiched therebetween whereby a continuing wheel turning engagement of the twine with the measuring wheel is effected.

3. The mechanism of claim 2 wherein the control means comprises a measuring wheel driven gear train, said gear train driving a cam, and means responsive to movement of the cam to actuate said knotting apparatus.

4. For use in a baler incorporating knotting apparatus and a twine supply, a twine measuring mechanism for actuation of the knotting apparatus in response to movement of a predetermined amount of twine, said mechanism being positioned between the twine supply and the knotting apparatus for reception of the twine as it moves from the supply to the knotting apparatus, said mechanism comprising a twine measuring element engageable by the twine and movable in response to passage of the twine thereover, and control means operative in response to a predetermined movement of the twine measuring element to activate the knotting apparatus, said twine measuring element comprising a rotatably mounted measuring wheel engageable at a point on its periphery by the twine with the frictional engagement therebetween effecting a rotation of the wheel in response to movement of the twine, a free rotating pressure wheel biased against the measuring wheel with the twine sandwiched therebetween whereby a continuing wheel turning engagement of the twine with the measuring wheel is effected, the control means comprising a measuring wheel driven gear train, said gear train driving a cam, and means responsive to movement of the cam to actuate said knotting apparatus, the means responsive to movement of the cam comprising an electric switch and knotting apparatus releasing solenoid electrically connected to the switch and responsive to a cam operation of the switch for effecting an actuation of the knotting apparatus.

5. The mechanism of claim 4 wherein said measuring wheel is removably mounted for selective replacement by measuring wheels of different sizes so as to vary the movement time of the cam and hence the frequency of actuation of the knotting apparatus and the size of the bale produced.

6. For use in a baler incorporating knotting apparatus and a twine supply, a twine measuring mechanism for actuation of the knotting apparatus in response to movement of a predetermined amount of twine, said mechanism being positioned between the twine supply and the knotting apparatus for reception of the twine as it moves from the supply to the knotting apparatus, said mechanism comprising a twine measuring element engageable by the twine and movable in response to passage of the twine thereover, and control means operative in response to a predetermined movement of the twine measuring element to activate the knotting apparatus, the control means comprising a twine measuring element driven gear train, said gear train driving a cam, and means responsive to movement of the cam to actuate said knotting apparatus, the means responsive to movement of the cam comprising an electric switch and knotting apparatus releasing solenoid electrically connected to the switch and responsive to a cam operation of the switch for effecting an actuation of the knotting apparatus.

7. The mechanism of claim 6 wherein said twine measuring element comprises a rotatably mounted measuring wheel engageable on its periphery by the twine with the frictional engagement therebetween effecting a rotation of the wheel in response to movement of the twine.

* * * * *